United States Patent
Natkin et al.

(10) Patent No.: US 7,284,528 B2
(45) Date of Patent: Oct. 23, 2007

(54) CRANK SHAFT SUPPORT ASSEMBLY

(75) Inventors: Robert J. Natkin, Canton, MI (US);
Bret Oltmans, Stacy, MN (US); John E. Allison, Ann Arbor, MI (US);
Thomas J. Heater, Milford, MI (US);
Joy Adair Hines, Plymouth, MI (US);
Grant K. Tappen, Washington, MI (US); Dietmar Peiskammer, Rochester, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 11/373,544

(22) Filed: Mar. 10, 2006

(65) Prior Publication Data

US 2007/0209628 A1    Sep. 13, 2007

(51) Int. Cl.
*F16M 1/00* (2006.01)
*F16M 1/021* (2006.01)
*B21K 3/00* (2006.01)

(52) U.S. Cl. ............................. 123/195 R; 123/195 A; 29/888.01

(58) Field of Classification Search ............ 123/195 R, 123/195 A; 74/606 R, 607; 92/146, 149; 29/888, 888.01
See application file for complete search history.

(56) References Cited

U.S. PATENT DOCUMENTS 3,046,952 A * 7/1962 Dolza ........................ 92/147
3,046,953 A * 7/1962 Dolza ........................ 92/147
4,682,672 A * 7/1987 Berger et al. .............. 184/106
5,357,921 A * 10/1994 Katoh et al. ............. 123/193.2

(Continued)

FOREIGN PATENT DOCUMENTS

DE    100 21 198 A1    3/2001

OTHER PUBLICATIONS

Čižek et al. "Study of selected properties of magnesium alloy AZ91 after heat treatment and forming." Journal of Materials Processing Technology. Nov. 18, 2004. ScienceDirect. Jan. 17, 2007. < http://www.sciencedirect.com/science?_ob=ArticleURL&_udi=B6TGJ-4DTTHN6-N&_coverDate=12%2F20%2F2004&_alid=525888190&_rdoc=1&_fmt=&_orig=search&_qd=1&_cdi=525.*
"Modulus of Elasticity, Strength Properties of Metals—Iron and Steel." Engineers Edge. Jan. 17, 2007. <http://www.engineersedge.com/manufacturing_spec/properties_of_metals_strength.htm>.*

(Continued)

*Primary Examiner*—Stephen K. Cronin
*Assistant Examiner*—Ka Chun Leung
(74) *Attorney, Agent, or Firm*—Reising, Ethington, Barnes, Kisselle, P.C.

(57) ABSTRACT

A crank shaft support assembly for increasing stiffness and reducing thermal mismatch distortion in a crank shaft bore of an engine comprising different materials. A cylinder block comprises a first material and at least two crank journal inserts are insert-molded into respective crank journal regions of the cylinder block and comprise a second material having greater stiffness and a lower thermal coefficient of expansion that the first material. At least two bearing caps are bolted to the respective crank journal inserts and define, along with the crank journal inserts, at least two crank shaft support rings defining a crank shaft bore coaxially aligned with a crank shaft axis. The bearing caps comprise a material having higher stiffness and a lower thermal coefficient of expansion than the first material and are supported on the respective crank journal inserts independently of any direct connection to the cylinder block.

19 Claims, 9 Drawing Sheets

U.S. PATENT DOCUMENTS

| | | | | |
|---|---|---|---|---|
| 5,370,087 | A * | 12/1994 | Guimond et al. | 123/54.6 |
| 5,501,529 | A * | 3/1996 | Cadle et al. | 384/432 |
| 5,816,710 | A * | 10/1998 | Warwick et al. | 384/433 |
| 6,076,971 | A * | 6/2000 | Warwick et al. | 384/433 |
| 6,357,412 | B1 * | 3/2002 | Menzl | 123/195 H |
| 6,543,405 | B2 * | 4/2003 | Sachdev et al. | 123/195 R |
| 7,048,812 | B2 * | 5/2006 | Bettles et al. | 148/420 |

OTHER PUBLICATIONS

"Aluminium." Wikipedia, The Free Encyclopedia. Jan. 16, i2007. Wikimedia Foundation, Inc. Jan. 17, 2007. <http://en.wikipedia.org/w/index.php?title=Aluminium&oldid=101163438>.*

"Iron." Wikipedia, The Free Encyclopedia. Jan. 15, 2007. Wikimedia Foundation, Inc. Jan. 17, 2007. <ttp://en.wikipedia.org/w/index.php?title=Iron&oldid=100971440>.*

"Magnesium." Wikipedia, The Free Encyclopedia. Jan. 15, 2007. Wikimedia Foundation, Inc. Jan. 17, 2007. <http://en.wikipedia.org/w/index.php?title=Magnesium&oldid=100896239>.*

* cited by examiner

CRANK SHAFT SUPPORT ASSEMBLY

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of Cooperative Agreement Nos. DE-FC05-950R22363 and DE-FC05-020R22910 awarded by the Department of Energy.

CROSS-REFERENCES TO RELATED APPLICATIONS

Not Applicable

BACKGROUND OF THE INVENTION

1. Field of the Invention

This invention relates generally to a crank shaft support assembly for increasing stiffness and reducing thermal mismatch distortion in a crank shaft bore of an engine comprising different materials.

2. Description of the Related Art Including Information Disclosed Under 37 CFR 1.97 and 1.98

It is known for internal combustion engines that have cylinder blocks comprising lightweight metals such as magnesium, to include a crank shaft support assemblies that include heavier, stiffer metals such as cast iron, and that are designed to reduce thermal mismatch distortion in a crank shaft bore of the engine. For example, the internal combustion engine cylinder crankcase disclosed in German patent document DE 10021198 B4, discloses a crank shaft support assembly including a magnesium cylinder block including an insert-molded ferrous skeleton that extends into a series of crank journals of the cylinder block. The skeleton comprises a metal such as cast iron or steel or a metal alloy that has high stiffness and a low thermal coefficient of expansion. A series of bearing clamps are bolted to the crank journals to form spaced-apart crank shaft support rings defining a crank shaft bore. Each bearing clamp comprises magnesium but also includes an insert-molded ferrous bearing clamp insert. The crank shaft support assembly of the German patent includes a pair of parallel magnesium skirt walls that connect outer edges of the bearing clamps and are formed with the bearing clamps as a single unitary ladder structure. The entire skirt and bearing clamp structure is bolted to the ferrous skeleton of the cylinder block by bolts extending through ferrous screw bus portions of the bearing clamp inserts. However, a crank shaft support assembly constructed according to the German patent is limited in its ability to reduce thermal mismatch stresses and distortions because its bearing clamps are supported directly on and are connected to magnesium cylinder block structures. This direct support of the bearing clamps on the magnesium cylinder block can result in a "banana" distortion effect of the crank journals and bearing clamps along the y (crank bore) axis.

What is needed is a crank shaft support assembly that further increases stiffness and reduces thermal mismatch distortion in a crank shaft bore of an engine comprising different metals.

BRIEF SUMMARY OF THE INVENTION

According to the invention, a crank shaft support assembly is provided for increasing stiffness and reducing thermal mismatch distortion in a crank shaft bore of an engine comprising different materials. The assembly includes a cylinder block comprising a first material and at least two crank journal inserts insert-molded into respective crank journal regions of the cylinder block and comprising a second material having greater stiffness and a lower thermal coefficient of expansion that the first material. The-crank shaft support assembly also includes at least two bearing caps bolted to the respective crank journal inserts and defining, along with the crank journal inserts, at least two crank shaft support rings defining a crank shaft bore coaxially aligned with a crank shaft axis. The bearing caps comprise a material having higher stiffness and a lower thermal coefficient of expansion than the first material.

Unlike the prior art of record, the bearing caps of the crank shaft support assembly are supported on the respective crank journal inserts independently of any direct connection to the cylinder block. This reduces thermal mismatch stresses and crank bore distortion.

According to another aspect of the invention the bearing caps comprise the second material, i.e., the same material as is used to form the crank journal inserts. This prevents any thermal mismatch stresses or distortions from arising between the bearing caps and the crank journal inserts.

According to another aspect of the invention each bearing cap includes a semi-cylindrical cut-away that defines a lower portion of a crank shaft support ring and is flanked by two crank journal interface surfaces.

According to another aspect of the invention the bearing caps are interconnected into a ladder structure to reduce banana distortion in y axis by increasing stiffness and dimensional stability.

According to another aspect of the invention the ladder structure includes side panels connected between adjacent bearing caps and the bearing caps and side panels are integrally formed together to form the ladder structure as a single unitary piece According to another aspect of the invention each bearing cap includes at least two bolt through-holes extending from a bottom edge of the prism to the crank journal interface surface.

According to another aspect of the invention each crank journal insert includes a plurality of posts connected across respective post tops by an upper arched beam and across respective post bases by a lower arched beam, the lower arched beam including a semi-cylindrical cut-away that defines an upper portion of a crank shaft support ring forming an interconnected post structure or "Chinese bridge" configuration that provides thermal expansion control, and holds loads from bearing cap bolts that pass through each bearing cap and are threaded directly into each corresponding insert thus providing stiffness, minimizing weight, and limiting thermal mismatch.

According to another aspect of the invention at least two of the posts of each crank journal insert each include a threaded bore configured to threadedly engage the shaft of a bolt.

According to another aspect of the invention each crank journal insert is integrally formed as a single unitary piece along with at least one casting locator pin extending integrally from a lower surface of each insert for use in positioning each insert during cylinder block casting.

According to another aspect of the invention each crank journal insert includes flow-through openings between the posts and arched beams to allow the first material to flow through the crank journal insert as the cylinder block is cast, providing a more thorough integration of the crank journal insert into the structure of the cylinder block.

According to another aspect of the invention at least one of the posts of each crank journal includes an oil passage extending from the semi-cylindrical cutaway and connecting to an oil passage formed in the cylinder block to provide fluid communication between a crankcase of the engine and a motor oil recirculating pump.

According to another aspect of the invention a pair of skirt walls extend downward from an outer rail of the cylinder block on opposite sides of the crank journal region to encompass, along with forward and rear seal plates, the crank journal region and bearing caps.

According to another aspect of the invention the skirt walls comprise the first material and are integrally formed with the cylinder block as a single unitary piece to eliminate an assembly step and to increase overall block stiffness and resistance to firing loads.

According to another aspect of the invention an oil pan is connectable to respective lower edges of the skirt walls and forward and rear seal plates are connectable across forward and aft openings defined by respective forward and rear edges of the oil pan and skirt walls, enclosing the crank journal region and bearing caps.

According to another aspect of the invention the first material comprises magnesium.

According to another aspect of the invention the second material comprises a ferrous material.

The invention also includes a method for making a crank shaft support. The method includes providing a first material and a second material having greater stiffness and a lower thermal coefficient of expansion than the first material, forming a crank journal insert comprising the second material and supporting the crank journal insert in a crank journal region of a cylinder block core mold. A cylinder block is cast by providing the first material in molten form in the cylinder block core mold and around the crank journal insert and allowing the first material to harden. The method further includes forming a bearing cap comprising a material having greater stiffness and a lower thermal coefficient of expansion that the first material and forming a crank shaft support ring by supporting the bearing cap on the crank journal insert such that the semi-cylindrical cutaway of each bearing cap is aligned coaxially with the semi-cylindrical cutaway of each corresponding crank journal insert so as to form the crank shaft support rings.

According to another aspect of the inventive method, the step of forming a crank journal insert comprising the second material includes forming the crank journal insert to include at least one casting locator pin extending integrally from a lower surface, and the step of positioning the insert in a cylinder block core during casting includes holding the insert by the locator pin.

According to another aspect of the inventive method, the step of forming a crank journal insert comprising the second material includes forming the crank journal insert to include flow-through openings.

According to another aspect of the inventive method, the step of forming a bearing cap includes forming the bearing cap of the second material.

According to another aspect of the inventive method, the step of forming a crank shaft support ring includes removing the locator pin, drilling holes into the crank journal insert, tapping the holes to form threads, drilling holes through the bearing caps, passing bolts through the through-holes in the bearing caps and threading them into the tapped holes of the crank journal inserts until the crank journal inserts contact the bearing caps at their respective interface surfaces.

BRIEF DESCRIPTION OF THE SEVERAL VIEWS OF THE DRAWINGS

These and other features and advantages of the invention will become apparent to those skilled in the art in connection with the following detailed description and drawings, in which.

DETAILED DESCRIPTION OF INVENTION EMBODIMENT

Figure 1:
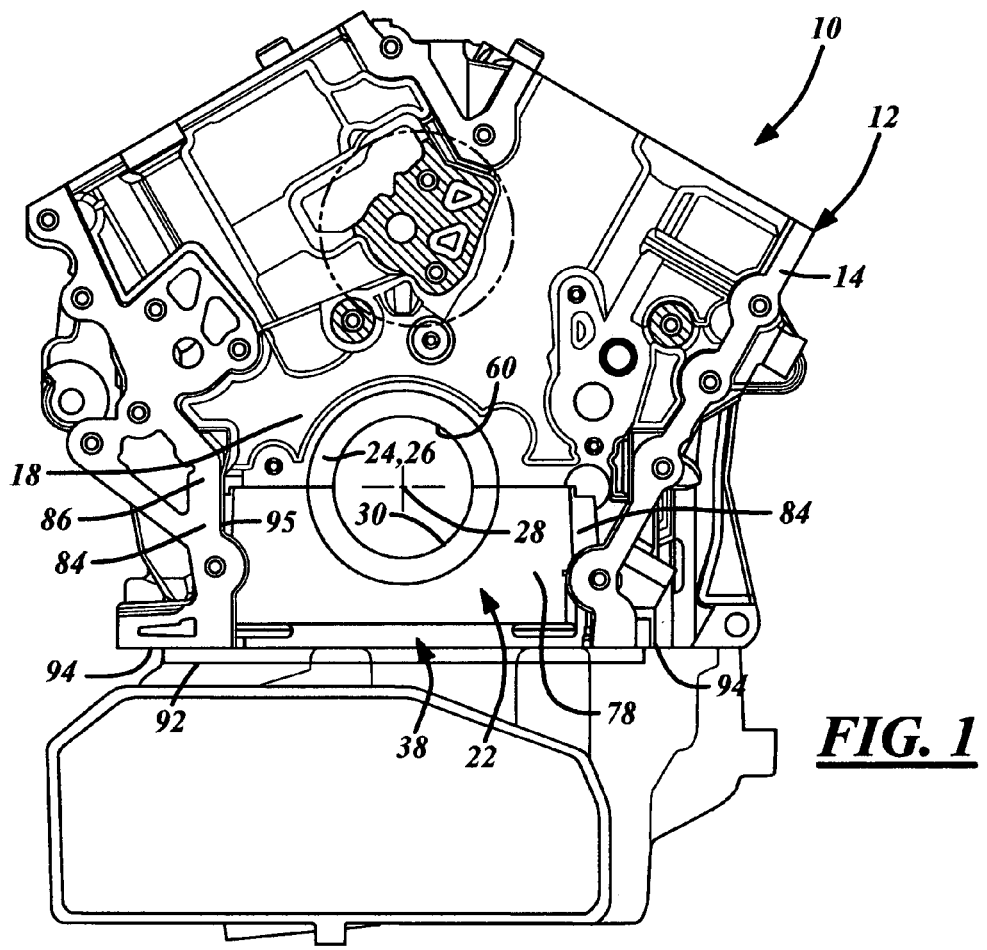
FIG. 1 is a front view of a crank shaft support assembly constructed according to the invention.

A crank shaft support assembly 10 for increasing stiffness and reducing thermal mismatch distortion in a crank shaft bore 26 of an engine comprising different materials is generally shown at 10 in the drawings. As shown in FIGS. 1, 3, 4, and 7-9, the assembly 10 includes a cylinder block 12 comprising a first metal material 14 such as magnesium or a magnesium matrix composite alloy and four crank journal inserts 16 that are insert-molded into respective crank journal regions 18 of the cylinder block 12. The crank journal inserts 16 comprise a second metal material 20 such as cast iron or steel or a metal alloy that has greater stiffness and a lower thermal coefficient of expansion than the first metal 14. As shown in FIGS. 1-6 the assembly 10 also includes four bearing caps 22 bolted to the respective crank journal inserts 16 and defining, along with the crank journal inserts 16, four crank shaft support rings 24 defining a crank shaft bore 26 coaxially aligned with a crank shaft axis 28 and configured to retain bearing rings for rotatably supporting a crank shaft along the crank shaft bore 26. Each of the bearing caps 22 comprises a metal material such as cast iron or steel or a metal alloy having higher stiffness and a lower thermal coefficient of expansion than the first metal 14 and are supported on the respective crank journal inserts 16 independently of any direct connection to the cylinder block 12 to reduce thermal mismatch stresses and crank bore distortion. Although in the present embodiment the first and second materials 14, 20 and the material of the bearing caps 22 are metals, in other embodiments, one or more of those materials may include other suitable substances such as ceramics.

Figure 3:
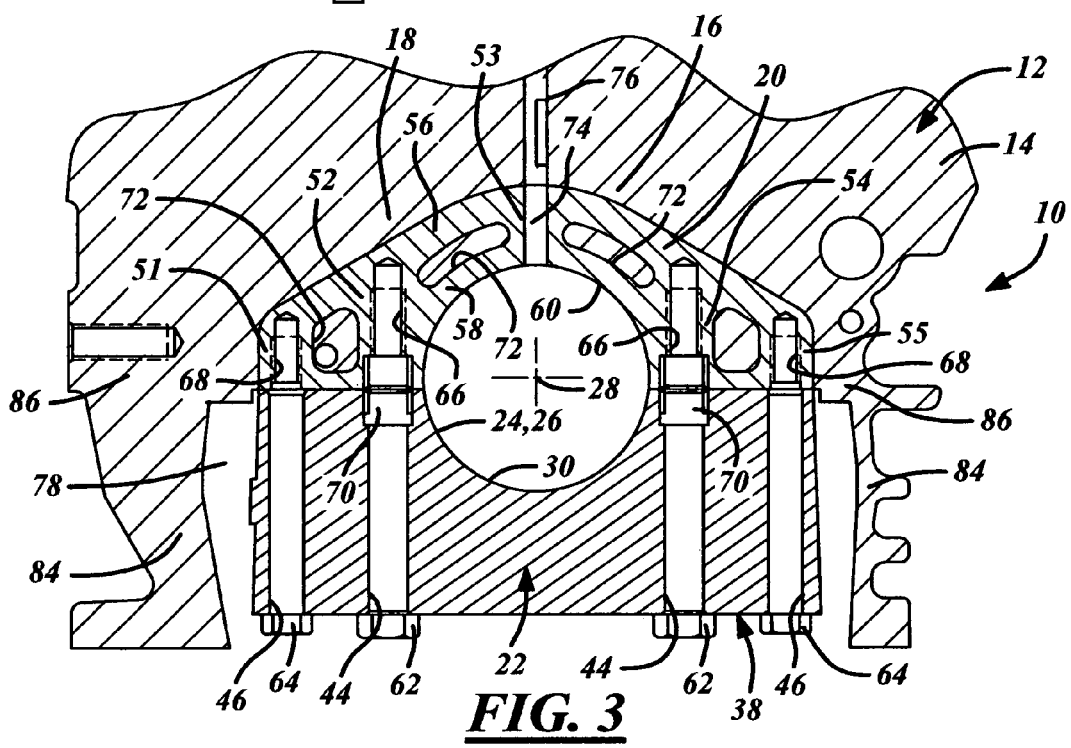
FIG. 3 is a cross-sectional view of the crank shaft support assembly of FIG. 1 taken along line 3-3 of FIG. 2.
Figure 4:
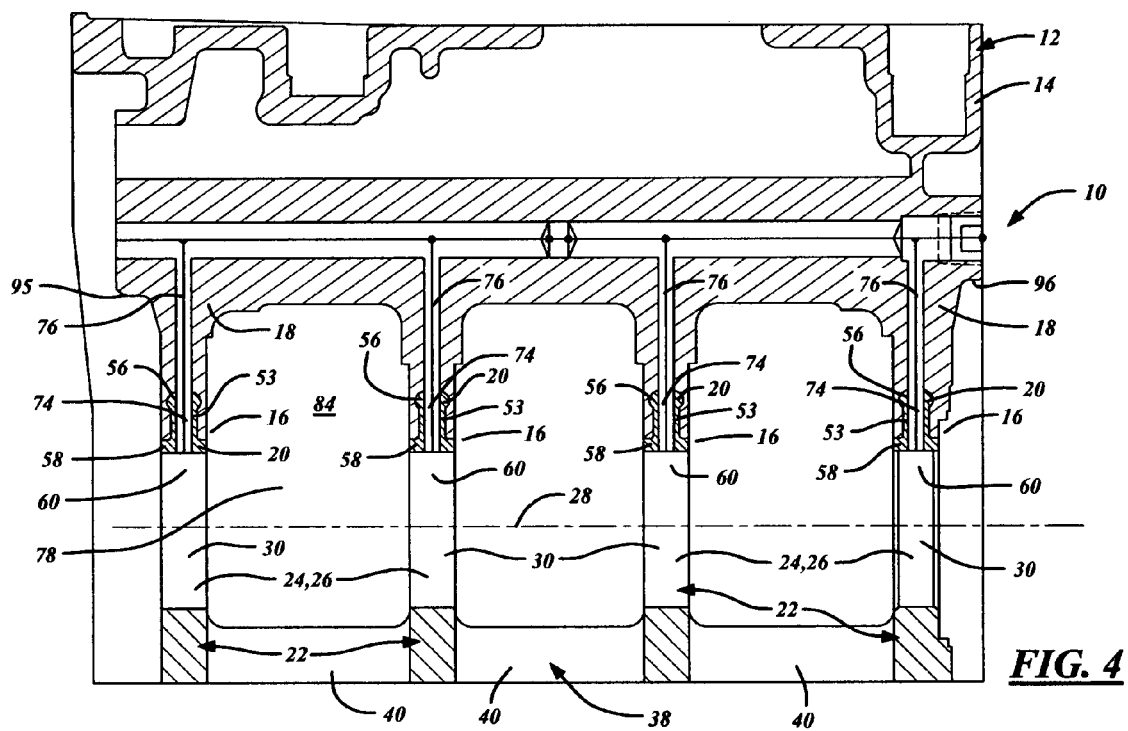
FIG. 4 is a cross-sectional view of the crank shaft support assembly of FIG. 1 taken along line 4-4 of FIG. 2.
Figure 5:
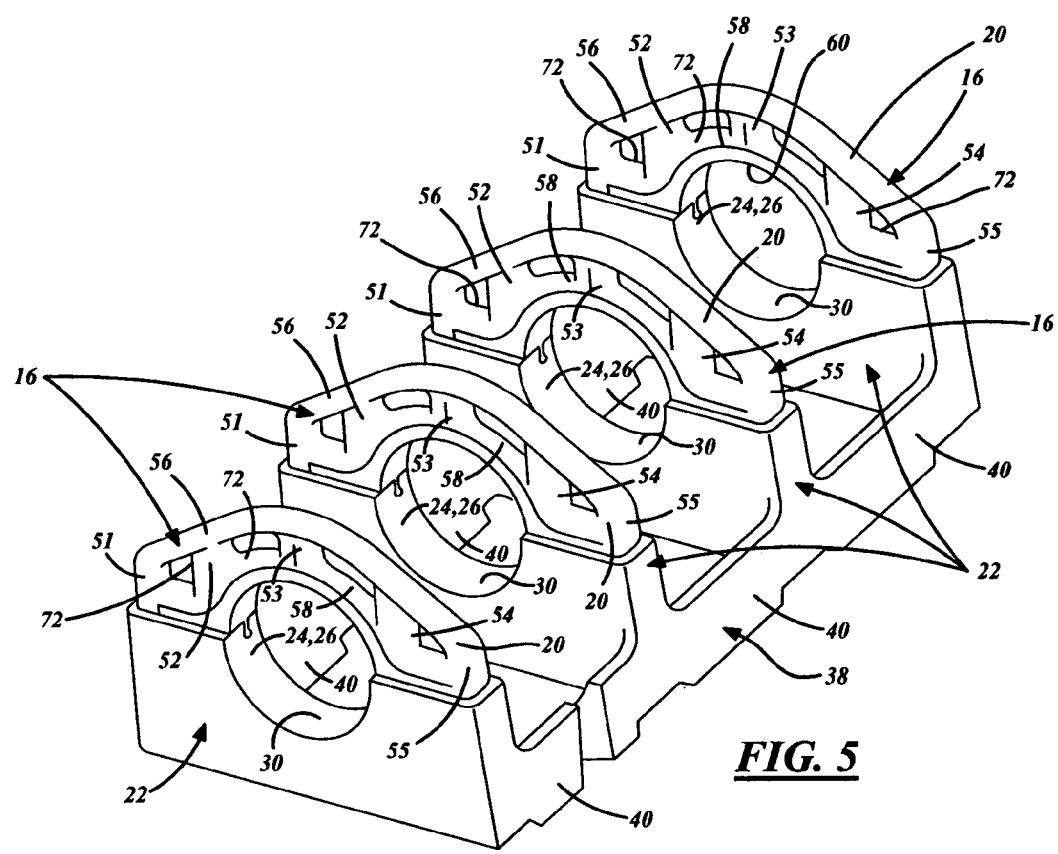
FIG. 5 is an orthogonal view of a bearing cap ladder and crank journal inserts of the crank shaft support assembly of FIG. 1 with a cylinder block of the assembly having been removed for clarity.
Figure 6:
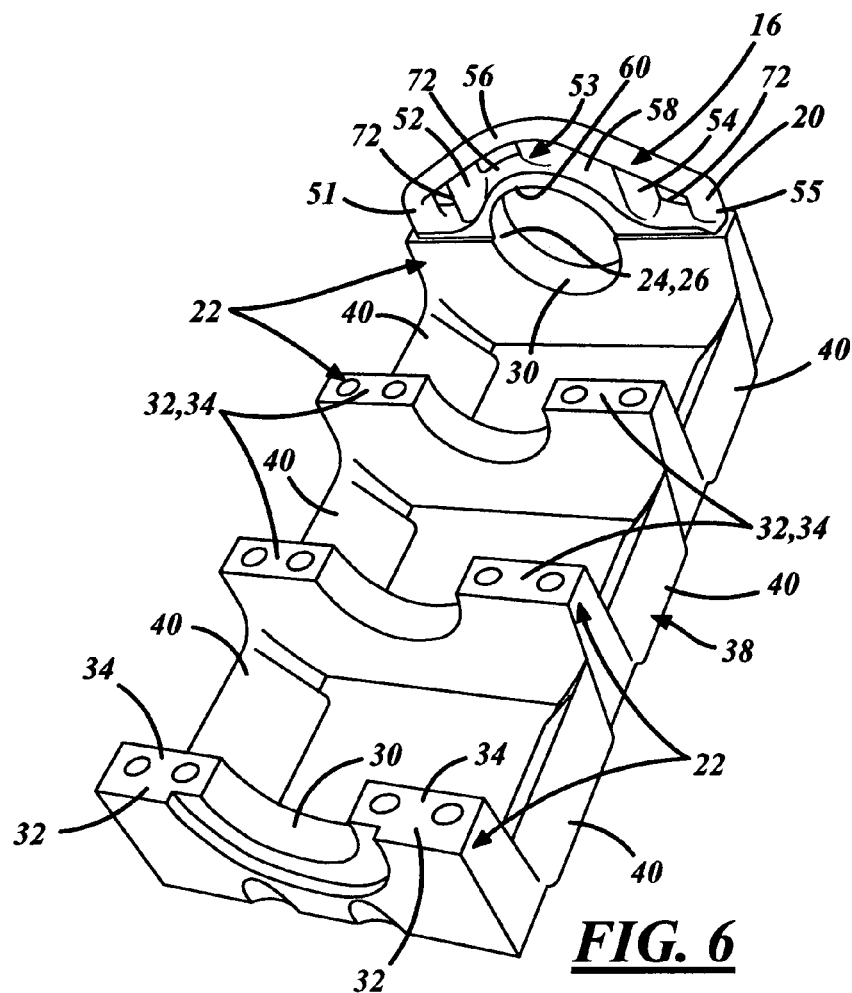
FIG. 6 is a second orthogonal view of the bearing cap ladder and single crank journal insert of the crank shaft support assembly of FIG. 1.
Figure 8:
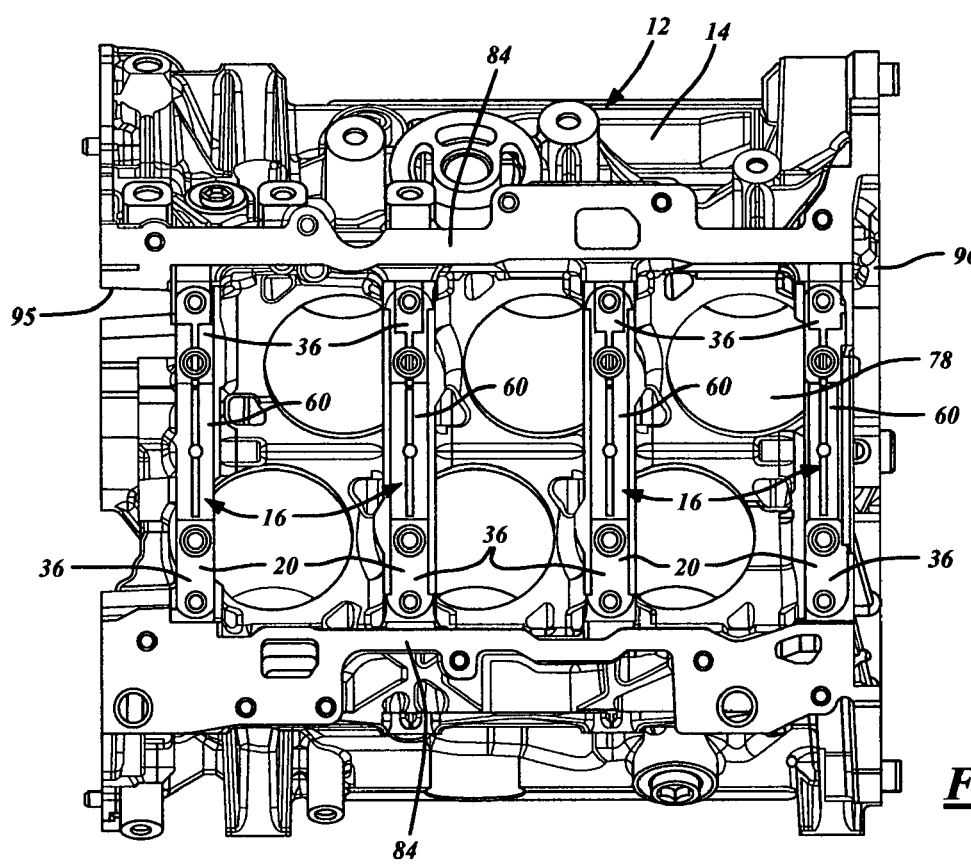
FIG. 8 is a bottom view of the crank shaft support assembly of FIG. 1 with the bearing cap ladder removed.

As best shown in FIGS. 3, 5, and 6, each bearing cap 22 has a generally rectangular prism or slightly trapezoidal prism shape and includes a semi-cylindrical cutaway 30 in a top edge 32 of each cap 22 that defines a lower portion of one of the crank shaft support rings 24. The lower semi-cylindrical cutaway 30 is flanked by two flat coplanar crank journal interface surfaces, best shown at 34 in FIG. 6, that together define the top edge 32 of each cap 22. These two spaced-apart coplanar flat surfaces 34 defining the top edge 32 of each bearing cap 22 are positioned to abut corresponding bearing cap interface surfaces 36 of each crank journal insert 16 when the bearing caps 22 are fastened to the respective crank journal inserts 16 as shown in FIGS. 1, 3, and 4-6. The bearing cap interface surfaces 36 of the crank journal insert 16 are best shown in FIG. 8.

Figure 2:
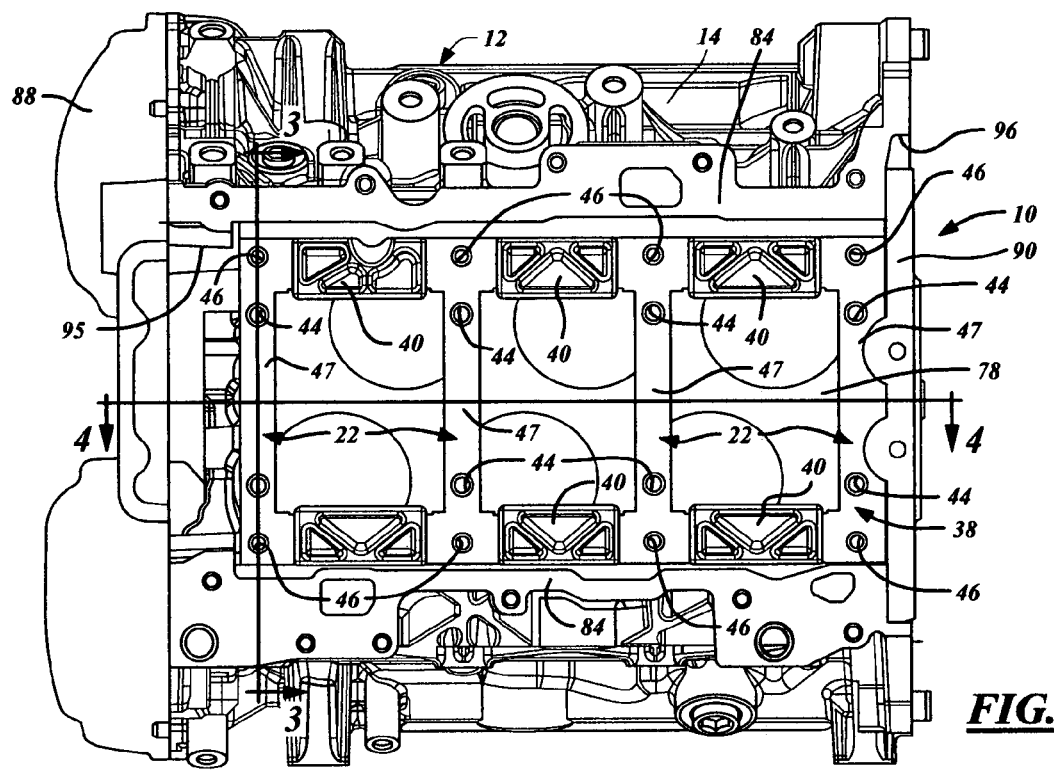
FIG. 2 is a bottom view of the crank shaft support assembly of FIG. 1.

The bearing caps 22 are interconnected into a ladder structure best shown at 38 in FIGS. 2, 5, and 6. The ladder configuration reduces or eliminates an effect known as "banana" distortion, which is a bowing in the y axis, i.e., in a vertical plane passing through the crank shaft axis 28. Interconnecting the bearing caps 22 into the ladder structure 38 limits or eliminates banana distortion by increasing stiffness and dimensional stability. The ladder structure 38 includes three pairs of side panels shown at 40 in FIGS. 2, 5, and 6 connected between adjacent bearing caps 22. The bearing caps 22 and side panels 40 are integrally formed together to form the ladder structure 38 as a single unitary piece. In the present embodiment, the bearing caps 22 and side panels 40 as well as the crank journal inserts 16 all comprise cast iron.

Figure 12:
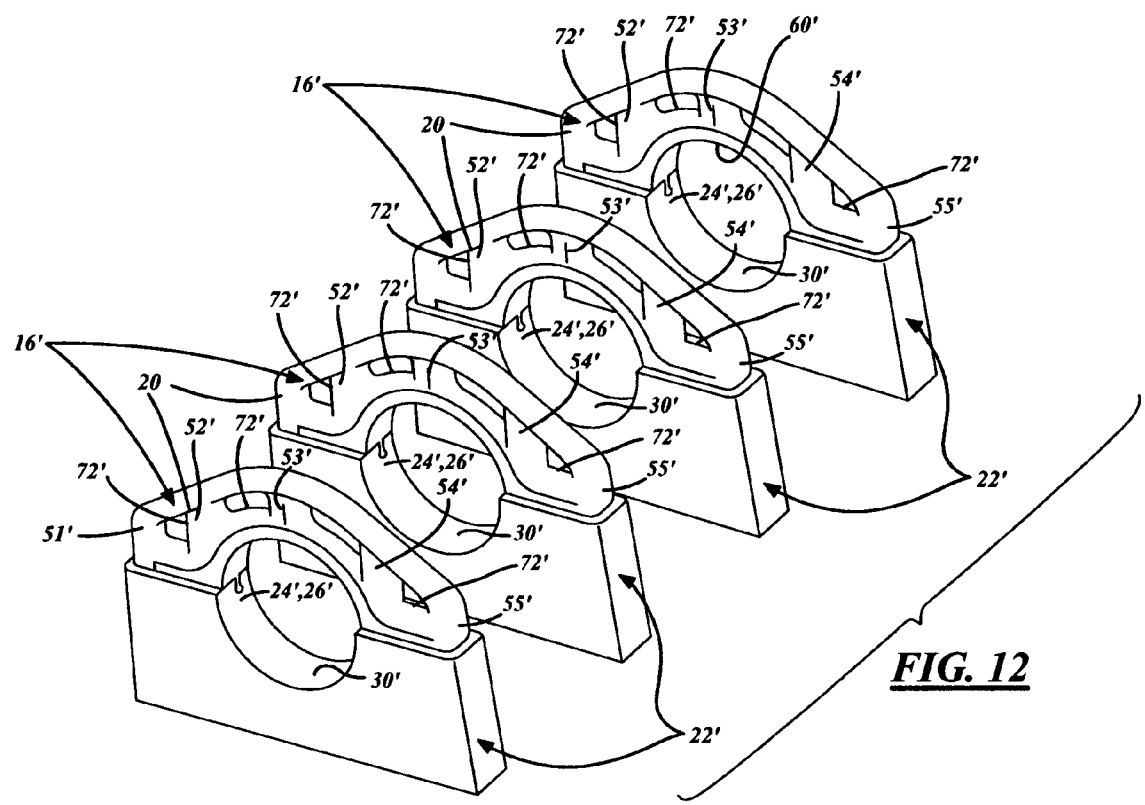
FIG. 12 is an orthogonal view of an alternative bearing cap arrangement.

In other embodiments the bearing caps may not be interconnected into a ladder structure. Instead, bearing caps 22' may be supported only from their respective crank journal inserts 16' as shown in FIG. 12.

Each bearing cap 22 includes a pair of inner bolt through-holes 44 and a pair of outer bolt through-holes 46, all of which extend through each bearing cap from a bottom edge 47 of each bearing cap 22 to the crank journal interface surface 34 of the top edge 32 of each cap 22 as shown in FIG. 3.

Figure 11:
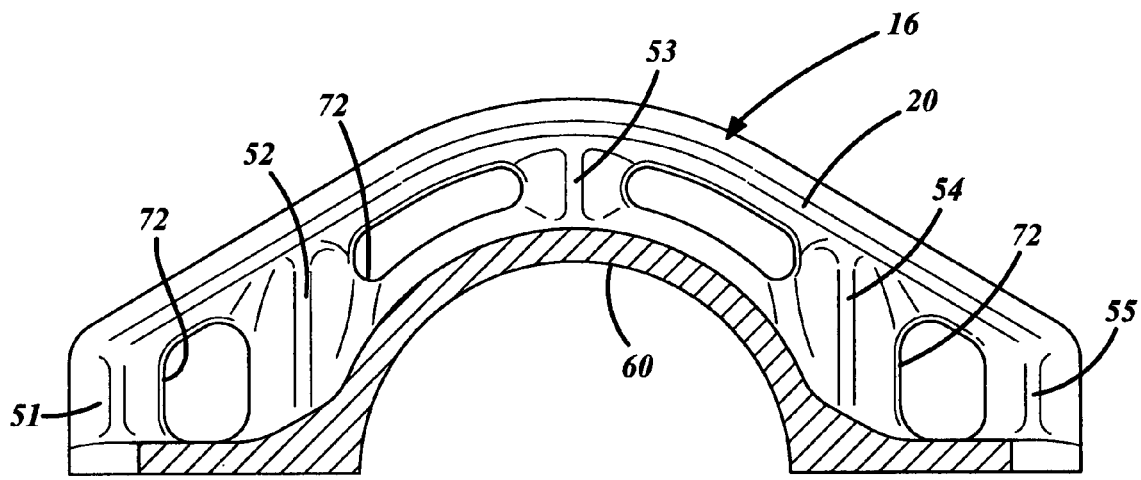
FIG. 11 is a front view of the crank journal insert of FIG. 10 with casting locator pins removed.
Figure 9:
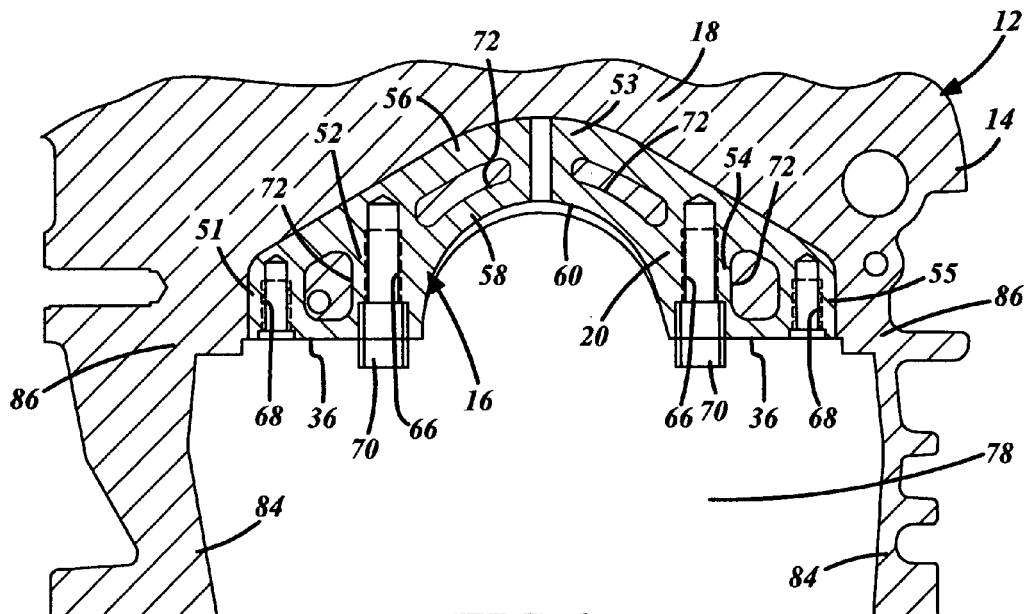
FIG. 9 is a cross-sectional view of the crank shaft support assembly of FIG. 1 taken along line 9-9 of FIG. 8.
Figure 10:
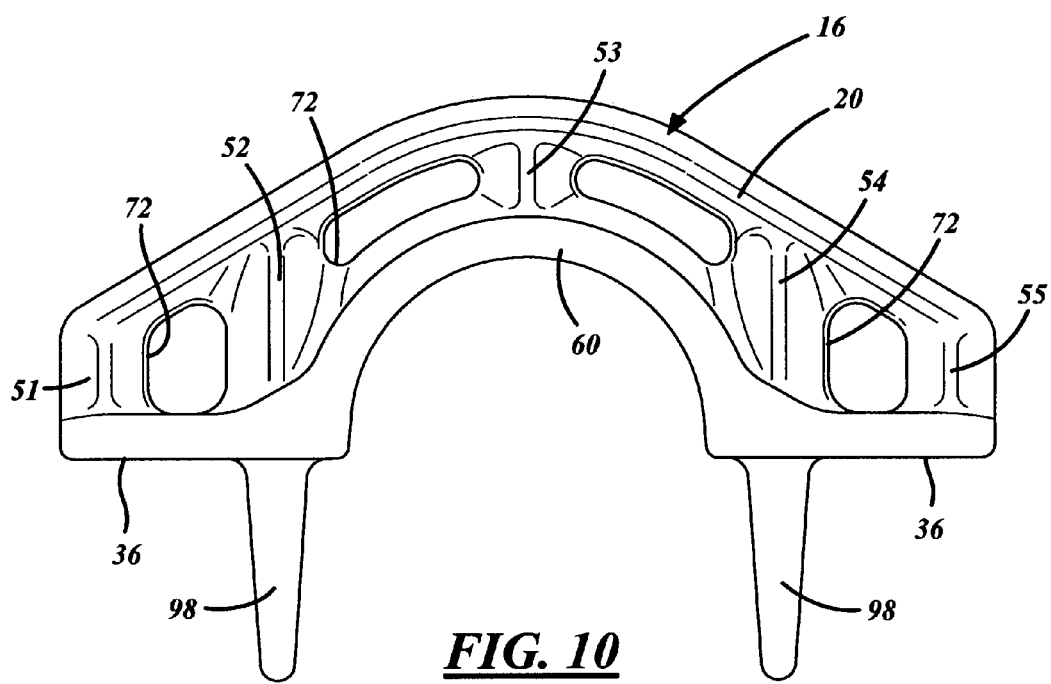
FIG. 10 is a front view of a crank journal insert of the crank shaft support assembly of FIG. 1 including casting locator pins.

As shown in FIGS. 3, 5-7, and 9-12 each crank journal insert 16 includes five generally parallel posts 51, 52, 53, 54, 55 connected across respective post tops by an upper arched beam 56 and across respective post bases by a lower arched beam 58. As best shown in FIGS. 10 and 11 the lower arched beam 58 of each crank journal insert 16 includes an upper semi-cylindrical cutaway 60 that defines an upper portion of a crank shaft support ring 24. This forms an interconnected post structure or "Chinese bridge" configuration that provides thermal expansion control and holds loads from bearing cap bolts 62, 64 that pass through each bearing cap 22 and are threaded directly into each corresponding crank journal insert 16 as shown in FIG. 3. The two bearing cap interface surfaces 36 of each crank journal insert 16 are flat surfaces disposed in a co-planar relationship to each other and flanking the upper semi-cylindrical cutaway 60 of each crank journal insert 16. The bearing cap interface surfaces 36 of each crank journal insert 16 are configured and positioned to abut the corresponding crank journal interface surfaces 34 of a bearing cap 22 when each bearing cap 22 is bolted to a crank journal insert 16 as shown in FIGS. 1, 3, and 4-6.

As best shown in FIG. 3, four posts 51, 52, 54, 55 of the five posts 51, 52, 53, 54, 55 of each crank journal insert 16 each include a threaded bore 66, 68 configured to threadedly engage the shaft of a bolt. An inner two threaded bores 66 of these four threaded bores 66, 68 are shaped to receive larger bolts 62 (M10 bolts in the present embodiment) while an outer two bores 68 of the four threaded bores 66, 68 are shaped to receive smaller bolts 64 (M8 bolts in the present embodiment). The four threaded bores 66, 68 extend upward into their respective posts from the bearing cap interface surfaces 36.

As shown in FIGS. 3 and 9 a hollow dowel 70 is disposed in each of the inner bolt through-holes 44 and extends into the corresponding inner threaded bores 66 of each corresponding crank journal insert 16. These hollow dowels 70 insure that bolts passed through the inner two through-holes 44 of each bearing cap 22 and into the inner two threaded bores of each crank journal insert 16 are centered correctly.

Each crank journal insert 16 includes four flow-through openings shown at 72 in FIGS. 3, 5-7, and 9-11. The openings 72 are disposed between and defined by the posts 51, 52, 53, 54, 55 and arched beams 56, 58. In other words, the respective positions of the posts 51, 52, 53, 54, 55 and arched beams 56, 58 define four openings 72 that allow molten metal to flow through during an engine block casting process.

The middle post 53 of the five posts 51, 52, 53, 54, 55 of each crank journal insert 16 includes an axially disposed oil drain passage shown at 74 in FIGS. 3 and 4. The oil drain passage 74 of each crank journal insert 16 extends from the upper semi-cylindrical cutaway 60 and connects to an oil passage 76 formed in the cylinder block 12. The drain passage 74 and oil passage 76 provide fluid communication between a motor oil recirculating pump (not shown) and a crank case 78 of an engine of which the assembly 10 is a part. Positioning oil drain passages in this way ensures that bearings supported in the crank shaft support rings 24 will receive adequate lubrication.

As shown in FIGS. 1-3 and 7-9 the crank case includes a deep skirt comprising a pair of generally parallel skirt walls 84 that extend downward from an outer rail 86 region of the cylinder block 12 on opposite side of the crank journal region 18. Along with forward and rear seal plates shown at 88, 90 in FIG. 2, the skirt walls 84 encompass the crank journal region 18 and bearing caps 22. The skirt walls 84 comprise the same metal as the cylinder block 12, which in the present embodiment is a magnesium matrix composite alloy. The skirt walls 84 are integrally formed with the cylinder block 12 as a single unitary piece by casting.

As shown in FIG. 1, an oil pan 92 connects to respective lower edges 94 of the skirt walls 84. The forward and rear seal plates 88, 90 cover forward and aft openings 95, 96 defined by respective forward and rear edges of the oil pan 92 and skirt walls 84, which encloses the crank journal region 18 and bearing caps 22. The oil pan 92 and the forward and rear seal plates 88, 90 comprise the same metal as the cylinder block 12.

Although the block 12 in the present embodiment is a four-cylinder block, the invention may be adapted to a cylinder block of any configuration and number of cylinders by including an insert 16 and a bearing cap 22 for each cylinder.

In practice, the crank shaft support assembly 10 is made by providing a first lightweight metal such as magnesium or, as in the present embodiment, a magnesium matrix composite alloy. A second metal 20 having a greater stiffness and a lower thermal coefficient of expansion than the first metal 14 is also provided. The second metal 20 comprises a ferrous metal and, in the present embodiment, is cast iron.

The four crank journal inserts 16 are each cast from the second metal 20 to include the Chinese bridge configuration described above as well as the flow-through openings 72. In addition, each of the inserts 16 is cast to include two casting locator pins 98 that extend integrally from the respective bearing cap interface surfaces 36 of each crank journal insert 16 as shown in FIG. 10.

Figure 7:
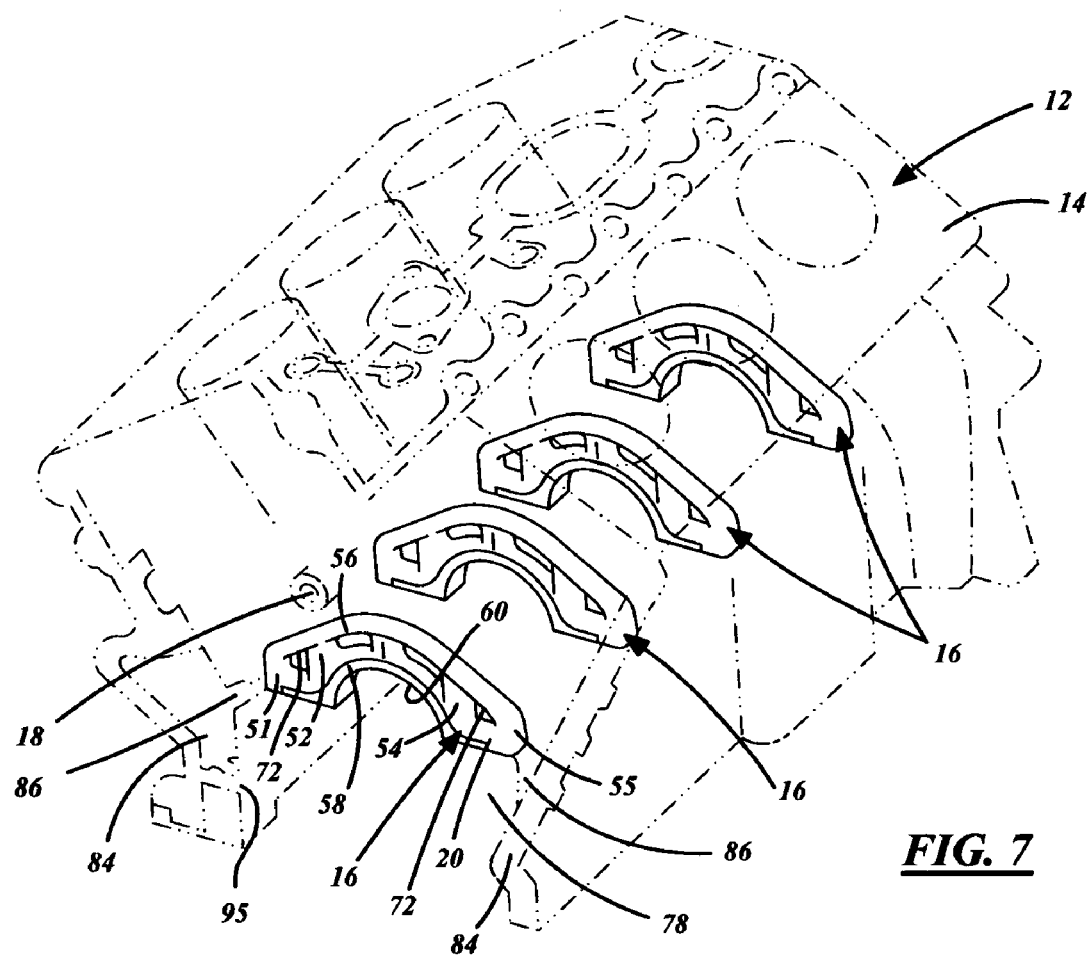
FIG. 7 is an orthogonal view of the crank shaft support assembly of FIG. 1 with the bearing cap ladder removed and with the cylinder block shown in phantom to reveal the positions of the crank journal inserts.

The four crank journal inserts 16 are then supported in a crank journal region 18 of a cylinder block 12 core mold. The crank journal inserts 16 are supported in their relative positions in the cylinder block 12 core mold by their respective locator pins 98, which remain outside the core during subsequent casting. The cylinder block 12 is then cast by providing the first metal 14 in molten form in the cylinder block 12 core mold and around and through the crank journal insert 16, and then allowing the first metal 14 to harden. The configuration of the assembly 10 at this stage of manufacture is best shown in FIGS. 7-9

The four bearing caps 22 are then formed from a metal having greater stiffness and a lower thermal coefficient of expansion than the first metal 14. In the present embodiment this means casting the four bearing caps 22 from the second metal 20, i.e., the same cast iron used to form the crank journal insert 16.

The four crank support rings 24 are then formed by supporting the bearing caps 22 on the crank journal inserts 16 such that the semi-cylindrical cutaway 30 of each bearing cap 22 is aligned coaxially with the upper semi-cylindrical cutaway 60 of each corresponding crank journal insert 16 so as to form the four crank support rings 24. The completed rings are best shown in FIGS. 1, 3, 5, and 6.

The four bearing caps 22 are supported on their respective crank journal inserts 16 by first removing the locator pins 98 from each crank journal insert 16 by machining or by other suitable means known in the art. Four parallel holes are then drilled upward into each crank journal insert 16 from the respective bottom bearing cap interface surfaces 36. These holes are then tapped to become the threaded bores 64, 66 of the crank journal insert 16.

The four through-holes 44, 46 in each bearing cap 22 are drilled so as to extend from the respective bottom edges 47 to the respective crank journal interface surfaces 34 of the bearing caps 22 as best shown in FIG. 3. These through-holes 44, 46 are positioned to axially align with the threaded bores 64, 66 in the corresponding crank journal inserts 16.

The bolts 62, 64 are subsequently passed through the through-holes 44, 46 in the bearing caps 22 and are threaded into the threaded bores 64, 66 of the crank journal inserts 16 until the crank journal inserts 16 contact the bearing caps 22 at their respective interface surfaces 34, 36.

Because the four bearing caps 22 are supported exclusively on the four respective crank journal inserts 16 the bearing caps 22 are supported independently of any direct connection to the cylinder block 12, reducing thermal mismatch stresses in the crank bore region of the block 12. By casting the bearing caps 22 together in a ladder formation the problem of banana distortion is alleviated.

This description is intended to illustrate certain embodiments of the invention rather than to limit the invention. Therefore, it uses descriptive rather than limiting words. Obviously, it's possible to modify this invention from what the description teaches. Within the scope of the claims, one may practice the invention other than as described.

What is claimed is:

1. A crank shaft support assembly for increasing stiffness and reducing thermal mismatch distortion in a crank shaft bore of an engine comprising different metals, the assembly comprising:

a cylinder block comprising a first material;

at least two crank journal inserts that are insert-molded into respective crank journal regions of the cylinder block, that comprise a second material having greater stiffness and a lower thermal coefficient of expansion than the first material, and that are shaped to provide a cross-planar mechanical lock between each crank journal insert and the cylinder block, the shape of each crank journal insert including one or more features selected from the group of features consisting of cross-planar ribbing, undercuts, and through-holes;

at least two bearing caps bolted to the respective crank journal inserts and defining, along with the crank journal inserts, at least two crank shaft support rings defining a crank shaft bore coaxially aligned with a crank shaft axis;

each of the bearing caps comprises a material having higher stiffness and a lower thermal coefficient of expansion than the first material and is supported on the respective crank journal inserts independently of any direct connection to the cylinder block; and each crank journal insert including a plurality of posts connected across respective post tops by an upper arched beam and across respective post bases by a lower arched beam, the lower arched beam including a semi-cylindrical cut-away that defines an upper portion of a crank shaft support ring.

2. A crank shaft support assembly as defined in claim 1 in which a pair of skirt walls extend downward from an outer rail of the cylinder block on opposite sides of the crank journal region.

3. A crank shaft support assembly as defined in claim 2 in which the skirt walls comprise the first material and are integrally formed with the cylinder block as a single unitary piece.

4. A crank shaft support assembly as defined in claim 2 in which an oil pan is connectable to respective lower edges of the skirt walls and forward and rear seal plates are connectable across forward and aft openings defined by respective forward and rear edges of the oil pan and skirt walls.

5. A crank shaft support assembly as defined in claim 1 in which each bearing cap includes a semi-cylindrical cut-away that defines a lower portion of a crank shaft support ring and is flanked by two crank journal interface surfaces.

6. A crank shaft support assembly as defined in claim 5 in which each bearing cap includes at least two bolt through-holes extending from a bottom edge of the prism to the crank journal interface surface.

7. A crank shaft support assembly as defined in claim 1 in which the bearing caps are interconnected into a ladder structure.

8. A crank shaft support assembly as defined in claim 7 in which:

the ladder structure includes side panels connected between adjacent bearing caps; and the bearing caps and side panels are integrally formed together to form the ladder structure as a single unitary piece.

9. A crank shaft support assembly as defined in claim 1 in which the bearing caps comprise the second material.

10. A crank shaft support assembly as defined in claim 1 in which at least two of the posts of each crank journal insert each include a threaded bore configured to threadedly engage the shaft of a bolt.

11. A crank shaft support assembly as defined in claim 1 in which each crank journal insert includes flow-through openings between the posts and arched beams.

12. A crank shaft support assembly as defined in claim 1 in which at least one of the posts of each crank journal includes an oil passage extending from the semi-cylindrical cutaway and connecting to an oil passage formed in the cylinder block.

13. A crank shaft support assembly as defined in claim 1 in which the first material comprises magnesium.

14. A crank shaft support assembly as defined in claim 1 in which the second material comprises a ferrous metal.

15. A crank shaft support assembly for increasing stiffness and reducing thermal mismatch distortion in a crank shaft bore of an engine comprising different metals, the assembly comprising:

a cylinder block comprising a first material;

at least two crank journal inserts that are insert-molded into respective crank journal regions of the cylinder block, that comprise a second material having greater stiffness and a lower thermal coefficient of expansion than the first material, and that are shaped to provide a cross-planar mechanical lock between each crank journal insert and the cylinder block, the shape of each crank journal insert including one or more features selected from the group of features consisting of cross-planar ribbing, undercuts, and through-holes;

at least two bearing caps bolted to the respective crank journal inserts and defining, along with the crank journal inserts, at least two crank shaft support rings defining a crank shaft bore coaxially aligned with a crank shaft axis; and each of the bearing caps comprises a material having higher stiffness and a lower thermal coefficient of expansion than the first material and is supported on the respective crank journal inserts independently of any direct connection to the cylinder block; and each crank journal insert being integrally formed as a single unitary piece along with at least one casting locator pin extending integrally from a lower surface of each insert.

16. A method for making a crank shaft support assembly, the method including the steps of:

providing a first material and a second material having greater stiffness and a lower thermal coefficient of expansion than the first material;

forming a crank journal insert comprising the second material and to include at least one casting locator pin extending integrally from a lower surface;

supporting the crank journal insert in a crank journal region of a cylinder block core mold by holding the insert by the locator pin;

casting a cylinder block by providing the first material in molten form in the cylinder block core mold and around the crank journal insert and allowing the first material to harden;

forming a bearing cap comprising a material having greater stiffness and a lower thermal coefficient of expansion that the first material; and forming a crank shaft support ring by supporting the bearing cap on the crank journal insert.

17. The method of claim 16 in which the step of forming a crank journal insert comprising the second material includes forming the crank journal insert to include flow-through openings.

18. The method of claim 16 in which the step of forming a bearing cap includes forming the bearing cap of the second material.

19. The method of claim 16 in which the step of forming a crank shaft support ring by supporting the bearing cap on the crank journal insert includes:

removing the locator pin;

drilling holes into the crank journal insert;

tapping the holes to form threads;

drilling holes through the bearing caps; and passing bolts through the through-holes in the bearing caps and threading them into the tapped holes of the crank journal inserts until the crank journal inserts contact the bearing caps at their respective interface surfaces.

* * * * *

UNITED STATES PATENT AND TRADEMARK OFFICE
CERTIFICATE OF CORRECTION

| | | |
|---|---|---|
| PATENT NO. | : 7,284,528 B2 | |
| APPLICATION NO. | : 11/373544 | |
| DATED | : October 23, 2007 | |
| INVENTOR(S) | : Robert J. Natkin et al. | |

It is certified that error appears in the above-identified patent and that said Letters Patent is hereby corrected as shown below:

On the cover page, item (73), "Ford Motor Company, Dearborn, MI (US)" should read --USAMP, Southfield, MI (US)--.

Signed and Sealed this
Twenty-ninth Day of March, 2011

David J. Kappos
*Director of the United States Patent and Trademark Office*